US012604069B2

(12) United States Patent

Hogan et al.

(10) Patent No.: US 12,604,069 B2

(45) Date of Patent: Apr. 14, 2026

(54) SYSTEM AND METHOD FOR MEDIA PLAN GENERATION FOR A CONTENT DELIVERY NETWORK

(71) Applicant: Tatari, Inc., San Francisco, CA (US)

(72) Inventors: Thomas Alexander Hogan, Brooklyn, NY (US); Timothy Davies Morton, Pasadena, CA (US); Jaeyeong Kim, Richmond, CA (US); Michael D. Swinson, Los Angeles, CA (US)

(73) Assignee: Tatari, Inc., San Francisco, CA (US)

( * ) Notice: Subject to any disclaimer, the term of this patent is extended or adjusted under 35 U.S.C. 154(b) by 0 days.

(21) Appl. No.: 18/779,834

(22) Filed: Jul. 22, 2024

(65) Prior Publication Data

US 2025/0039516 A1 Jan. 30, 2025

Related U.S. Application Data

(60) Provisional application No. 63/515,258, filed on Jul. 24, 2023.

(51) Int. Cl.

| | |
|---|---|
| *H04N 21/234* | (2011.01) |
| *H04N 21/24* | (2011.01) |
| *H04N 21/25* | (2011.01) |
| *H04N 21/431* | (2011.01) |
| *H04N 21/433* | (2011.01) |
| *H04N 21/44* | (2011.01) |
| *H04N 21/442* | (2011.01) |

| | |
|---|---|
| *H04N 21/45* | (2011.01) |
| *H04N 21/466* | (2011.01) |
| *H04N 21/475* | (2011.01) |
| *H04N 21/81* | (2011.01) |

(52) U.S. Cl.

CPC .................................. *H04N 21/812* (2013.01)

(58) Field of Classification Search

None

See application file for complete search history.

(56) References Cited

U.S. PATENT DOCUMENTS

| | | | | |
|---|---|---|---|---|
| 2009/0319555 A1* | 12/2009 | Ragno | ..................... | G06F 16/93 |
| | | | | 707/999.005 |
| 2009/0327029 A1* | 12/2009 | Collins | .............. | G06Q 30/0241 |
| | | | | 705/14.43 |
| 2014/0196081 A1* | 7/2014 | Emans | ............... | H04N 21/2542 |
| | | | | 725/32 |
| 2017/0339020 A1* | 11/2017 | Khanna | .................. | G06Q 30/02 |
| 2022/0337896 A1* | 10/2022 | Beach | .............. | H04N 21/44224 |
| 2024/0396654 A1 | 11/2024 | Fairchild et al. | | |

* cited by examiner

*Primary Examiner* — Brian T Pendleton

*Assistant Examiner* — Jean D Saint Cyr

(74) *Attorney, Agent, or Firm* — Sprinkle IP Law Group

(57) ABSTRACT

Media plan generation systems and methods for TV advertising are disclosed. Embodiments of these systems and methods are adapted to generate a media plan comprising a core plan and a test plan. The core plan may be produced based on historical models regarding historical performance of an entity's media while the test plan may be produced based on a predictive model of media performance.

18 Claims, 15 Drawing Sheets

Generate bookings ✕

AI-driven automation adds optimized bookings to your plan, aligning with company goals ↗ and leveraging historical data.

Campaign

| Select... ▼ |

Plan Weeks

| May 27 - Jun 23, 2024 📅 |

Choose an objective

| Awareness ○ | Consideration ○ | Conversion ○ |
|---|---|---|
| Prioritize reaching potential customers. | Prioritize interest from potential customers. | Prioritize actions your customers are taking. |

Target Budget

| $ |

Optimize for

| Select... ▼ |

Booking Distribution

| 80 % core | 20 % test |

Core Historical Performance

| Jan 20 - May 19, 2024 📅 |

15s|30s

| 0 % | 100 % |

Choose an Attribution Method

| Select... ▼ |

Advanced Settings                    Defaults applied ⌃

Targeting Distribution

| % Run of site | % Publisher targeting |

| Add Exclusions ▼ |

FIG. 4C

| | net_spend | conversions | cost_per_conversion | n_spots | n_weeks | network_tier | rotation_hrs | gross_cost | network_name | network_rotation_name |
|---|---|---|---|---|---|---|---|---|---|---|
| 0 | 799.0 | 6.0 | 125.0 | 124.0 | 5.0 | 3.0 | 14.0 | 45.0 | DEST | Everyday Overnight |
| 1 | 592.0 | 5.0 | 127.0 | 146.0 | 5.0 | 3.0 | 21.0 | 15.0 | EXTV | Everyday Early Morning |
| 2 | 1034.0 | 3.0 | 336.0 | 200.0 | 5.0 | 3.0 | 42.0 | 40.0 | EXTV | Everyday Prime |
| 3 | 1855.0 | 6.0 | 301.0 | 99.0 | 5.0 | 3.0 | 28.0 | 100.0 | STAV | Everyday Overnight |
| 4 | 4671.0 | 16.0 | 293.0 | 91.0 | 4.0 | 3.0 | 42.001944 | 160.0 | TCN | Everyday Prime |
| 5 | 979.0 | 3.0 | 375.0 | 202.0 | 5.0 | 3.0 | 63.0 | 30.0 | EXTV | Everyday Weekday |
| 6 | 6966.0 | 23.0 | 299.0 | 135.0 | 6.0 | 3.0 | 35.0 | 150.0 | DABL | Everyday Prime |
| 7 | 24140.0 | 62.0 | 392.0 | 181.0 | 6.0 | 3.0 | 42.0 | 300.0 | STAV | Everyday Prime |
| 8 | 1428.0 | 5.0 | 286.0 | 15.0 | 4.0 | 3.0 | 20.0 | 150.0 | COZI PLUS | Weekday Prime |
| 9 | 5924.0 | 13.0 | 445.0 | 95.0 | 6.0 | 1.0 | 20.0 | 400.0 | ID-Locals | Weekday Early Fringe |
| 10 | 17382.0 | 39.0 | 449.0 | 145.0 | 6.0 | 3.0 | 40.0 | 410.0 | COZI | Weekday Day |
| 11 | 1628.0 | 4.0 | 415.0 | 68.0 | 6.0 | 3.0 | 21.0 | 65.0 | TCN | Everyday Early Morning |
| 12 | 8916.0 | 24.0 | 364.0 | 121.0 | 6.0 | 1.0 | 28.0 | 500.0 | ID-Locals | Everyday Prime |
| 13 | 16171.0 | 42.0 | 383.0 | 97.0 | 6.0 | 3.0 | 15.0 | 480.0 | COZI | Weekday Early Fringe |
| 14 | 916.0 | 2.0 | 439.0 | 94.0 | 5.0 | 3.0 | 10.0 | 30.0 | OVAT | Weekday Early Morning |

FIG. 5A

| | 0 | 1 | 2 | 3 | 4 |
|---|---|---|---|---|---|
| network_id | 19539 | 19539 | 26530 | 26530 | 26530 |
| targeting_type | ros | ros | targeted | targeted | targeted |
| minimum_spend | 30000.0 | 30000.0 | 30000.0 | 30000.0 | 30000.0 |
| cpm | 16.67 | 16.67 | 12.0 | 11.2 | 10.5 |
| start_date_inclusive | 2024-01-01 | 2023-07-01 | 2023-07-01 | 2024-01-01 | 2024-04-01 |
| end_date_inclusive | 2024-03-31 | 2023-12-31 | 2023-12-31 | 2024-03-31 | 2024-06-30 |
| estimated_daily_capacity | 300051.0 | 300051.0 | 45534.0 | 45534.0 | 45534.0 |
| target_genre_ids | None | None | None | None | None |
| total_impressions | 5022805 | 5022805 | 5462645 | 5462645 | 5462645 |
| total_spend | 101956.592862 | 101956.592862 | 50851.95 | 50851.95 | 50851.95 |
| historical_rr | 0.000501 | 0.000501 | 0.000363 | 0.000363 | 0.000363 |
| average_daily_impressions | 53434.095745 | 53434.095745 | 124151.022727 | 124151.022727 | 124151.022727 |
| xpc | 0.030035 | 0.030035 | 0.030268 | 0.03243 | 0.034592 |

FIG. 5B

| | cpv_score | network_tier | rotation_hours | gross_cost | net_rate_cost | network_name | network_rotation_name |
|---|---|---|---|---|---|---|---|
| 0 | 8.06523 | 3.0 | 14.0 | 45.0 | 38.25 | DEST | Everyday Overnight |
| 1 | 48.370217 | 3.0 | 21.0 | 15.0 | 12.75 | EXTV | Everyday Early Morning |
| 2 | 35.912935 | 3.0 | 42.0 | 40.0 | 34.0 | EXTV | Everyday Prime |
| 3 | 9.87113 | 3.0 | 28.0 | 100.0 | 85.0 | STAV | Everyday Overnight |
| 4 | 17.452861 | 3.0 | 42.001944 | 160.0 | 136.0 | TCN | Everyday Prime |
| 5 | 29.349227 | 3.0 | 63.0 | 30.0 | 25.5 | EXTV | Everyday Weekday |
| 6 | 27.752701 | 3.0 | 35.0 | 150.0 | 127.5 | DABL | Everyday Prime |
| 7 | 14.132429 | 3.0 | 42.0 | 300.0 | 255.0 | STAV | Everyday Prime |
| 8 | 23.032027 | 3.0 | 20.0 | 150.0 | 127.5 | COZI PLUS | Weekday Prime |
| 9 | 5.101813 | 1.0 | 20.0 | 400.0 | 340.0 | ID-Locals | Weekday Early Fringe |
| 10 | 7.992332 | 3.0 | 40.0 | 410.0 | 348.5 | COZI | Weekday Day |
| 11 | 16.208955 | 3.0 | 21.0 | 65.0 | 55.25 | TCN | Everyday Early Morning |
| 12 | 5.64274 | 1.0 | 28.0 | 500.0 | 425.0 | ID-Locals | Everyday Prime |
| 13 | 10.097302 | 3.0 | 15.0 | 480.0 | 408.0 | COZI | Weekday Early Fringe |
| 14 | 7.408323 | 3.0 | 10.0 | 30.0 | 25.5 | OVAT | Weekday Early Morning |
| 15 | 5.273477 | 1.0 | 35.0 | 300.0 | 255.0 | ID-Locals | Weekday Day |
| 16 | 11.49773 | 3.0 | 28.0 | 525.0 | 446.25 | COZI | Everyday Prime |

FIG. 6A

| | 0 | 1 | 2 | 3 | 4 |
|---|---|---|---|---|---|
| booking_unit_id | 141162 | 1212 | 1212 | 1212 | 1358 |
| network_id | 82581 | 6532 | 6532 | 6532 | 9569 |
| publisher_code | None | None | None | None | None |
| parent_network_code | None | None | None | None | None |
| targeting_type | ros | ros | ros | ros | ros |
| minimum_spend | NaN | NaN | NaN | NaN | NaN |
| cpm | 7.65 | 12.0 | 10.0 | 12.0 | 6.0 |
| start_date_inclusive | 2023-09-25 | 2023-07-03 | 2023-12-25 | 2024-01-08 | 2023-12-25 |
| end_date_inclusive | 2024-03-31 | 2023-12-24 | 2024-01-07 | 2024-03-31 | 2024-01-14 |
| estimated_daily_capacity | 290014.0 | 117347.0 | 117347.0 | 117347.0 | 438552.0 |
| target_genre_ids | None | [] | [] | [] | None |
| company_id | 7100.0 | 7100.0 | 7100.0 | 7100.0 | 7100.0 |
| cpv_score | 13.0 | 11.0 | 11.0 | 11.0 | 17.0 |

FIG. 6B

| | network_ name | network_rotation_ name | gross_ cost | network_ tier | booked_ rate | shave_ rate | pred_cir | spots_15 | spots_30 | booking_ tag | value |
|---|---|---|---|---|---|---|---|---|---|---|---|
| 0 | DEST | Everyday Overnight | 45.0 | 3.0 | 22.68 | 0.495833 | 0.890662 | 8.0 | 6.0 | core | 7.707145 |
| 1 | EXTV | Everyday Early Morning | 15.0 | 3.0 | 7.88 | 0.475 | 0.885138 | 12.0 | 9.0 | core | 7.604988 |
| 2 | EXTV | Everyday Prime | 40.0 | 3.0 | 19.50 | 0.5125 | 0.884341 | 24.0 | 18.0 | core | 2.859555 |
| 3 | STAV | Everyday Overnight | 100.0 | 3.0 | 59.16 | 0.408333 | 0.861566 | 16.0 | 12.0 | core | 3.198017 |
| 4 | TCN | Everyday Prime | 160.0 | 3.0 | 97.50 | 0.390625 | 0.877158 | 24.0 | 18.0 | core | 3.281788 |
| ... | | | ... | ... | ... | ... | ... | ... | ... | ... | ... |
| 211 | SUND | Everyday Late Night | 65.0 | 2.0 | 45.74 | 0.296296 | 0.329990 | 20.0 | 15.0 | test | 0.794306 |
| 212 | DXD | Weekday Early Fringe | 150.0 | 2.0 | 84.04 | 0.439688 | 0.629048 | 6.0 | 4.0 | test | 0.605472 |
| 213 | UKID | Weekday Early Fringe | 100.0 | 2.0 | 70.98 | 0.290278 | 0.442710 | 8.0 | 6.0 | test | 0.764634 |
| 214 | TWC | Weekday Day | 200.0 | 2.0 | 157.82 | 0.210938 | 0.750922 | 17.0 | 13.0 | test | 0.789595 |
| 215 | UKID | Everyday Late Night | 30.0 | 2.0 | 21.42 | 0.286111 | 0.327196 | 12.0 | 9.0 | test | 0.700907 |

208 rows x 11 columns

FIG. 7

SYSTEM AND METHOD FOR MEDIA PLAN GENERATION FOR A CONTENT DELIVERY NETWORK

RELATED APPLICATIONS

This application claims a benefit of priority under 35 U.S.C. § 119(e) from U.S. Provisional Application No. 63/515,258, filed Jul. 24, 2023, entitled "SYSTEMS AND METHOD FOR MEDIA PLAN GENERATION FOR A CONTENT DELIVERY NETWORK," by inventors Hogan, Morton, Kim, and Swinson, the entire content of which is hereby fully incorporated by reference herein for all purposes.

TECHNICAL FIELD

The present disclosure relates generally to distributed and networked content delivery networks. Specifically, embodiments of the present disclosure relate to the automatic generation of media plans for content delivery networks. Even more particularly, embodiments of the present disclosure relate to the automatic generation of optimized media plans for remnant advertising purchasing for television networks.

BACKGROUND

With the advent of the Internet, many aspects of modern life are now digitally connected through the seemingly ubiquitous smart phones, smart televisions, smart home appliances, Internet of Things (IoT) devices, websites, mobile apps, etc. Even so, many more analog aspects remain disconnected from this digital world. Linear television (TV) is an example of an offline medium that is disconnected from the digital world. "Linear TV" refers to real time (live) television services that transmit TV program schedules. Almost all broadcast TV services can be considered as linear TV.

Recently, however, the delivery of entertainment content (e.g., shows, movies, sports, etc.) has shifted to what is often referred to as non-linear TV. Non-linear TV covers streaming and on-demand programming, which can be viewed at any time and is not constrained by real-time broadcast schedules. Video-on-demand (VOD) and near video-on-demand (NVOD) transmissions of pay-per-view programs over channel feeds are examples of non-linear TV.

All these forms of TV are an indispensable advertising channel for many entities due to its potential for massive scale, low cost, and long-form format. The planning of advertising for these various forms of television is complicated by a number of factors, some of them based on the medium of delivery of the related content.

What is desired, therefore, are systems and methods that allow the generation of media plans for entities that wish to advertise in association with linear TV or various forms of non-linear TV.

SUMMARY

In the current environment for content delivery and consumption (referred to herein without loss of generality as "television" or "TV"), there are two main distribution methodologies. Non-linear TV such as streaming, and on-demand programming may be delivered through such a computer based network while linear TV refers to real time (live) television delivered over an offline medium such as over the air broadcasts or a cable.

All these forms of TV are an indispensable advertising channel for many entities. Determining how to implement such advertising is, however, a complex endeavor. Embodiments herein may thus be adapted to efficiently generate media plans for various forms of TV (e.g., linear or non-linear TV) advertising, accounting for an entity's specific preferences.

Specifically, a media plan engine according to certain embodiments are disclosed, where the media plan engine may automatically create remnant or other types of (linear or non-linear) TV advertising plans according to parameters and an objective input by a user (e.g., by using trained model to optimize such media plans).

In particular, a media plan generated by embodiments of a media plan generator may comprise two portions: a core plan generator for generating a core plan and a test plan generator for generating a test plan. The core plan may be produced based on historical data regarding historical performance of an entity's advertisements, while the test plan may be produced based on a prediction (e.g., generated from a predictive algorithm) of performance of available advertising slots or other information. The core media plan and test media plan may be generated and divided according to various parameters including an entity's risk profile related to the entity's relative desire to base their media plan on proven historical advertising or predictive metrics regarding performance.

The use of both a core media plan and a test media plan are adapted to provide embodiments the ability to allow an entity to balance an entity's desire for proven effective advertising with a predictive test plan to offer an entity advertising options that have been predictively determined to be effective based on trained machine learning models or other rules, allowing an entity to more easily A/B test their advertising strategies within both the framework of their risk profile and their budget.

Accordingly, embodiments may offer plans based on 1) historical performance data of an entity's advertisement; 2) predictive performance of advertisements (e.g., determined using a predictive performance model) and 3) patterns (e.g., models) of bids and successful ad runs from previous periods that are optimized for a performance criteria (where those models may be constructed based on all or a subset of entities that utilize the media plan engine, not just the entity of interest). Note that the training data for these models can comprise both of human generated media plans as well as plans created by the media planning engine.

In one embodiment, a media plan generation system may include a processor and a data store comprising spot airing data received from one or more spot airing data providers, the spot airing data including data on available units of advertising available in an offline television medium. The data store can also include historical data comprising historical performance data related to an entity's historical units of advertising in the offline television medium.

The media plan generation system can be adapted to obtain a media plan request comprising optimization parameters and generate a media plan comprising a core media plan and a test media plan. The media plan can thus be generated by generating the core media plan and the test media plan. The generation of the core media plan may be accomplished by creating a core media pool by selecting available units of advertising for the core media pool, wherein each of the selected available units corresponding to one or more of the entity's historical units of advertising; ranking the available units of the core medial pool; and optimizing the core media plan according to the optimization parameters based on the rankings of the available units of the core media pool using a bid optimizer. The bid optimizer works by applying a clearance prediction model to the available units of the core media pool and searching the space of configurations of bids on the available units of the core media pool and evaluating the result of each configuration based on the optimization parameters, and thus an optimal configuration can be selected.

The test media plan can be generated by creating a test media pool by selecting available units of advertising for the test media pool; ranking the available units of the test media pool based on a predictive model; optimizing the test media plan according to the optimization parameter based on the rankings of the available units of the test media pool using the bid optimizer. The bid optimizer works by applying a clearance prediction model to the available units of the test media pool and searching the space of configurations of bids on the available units of the test media pool and evaluating the result of each configuration based on the optimization parameters, and thus an optimal configuration can be selected.

In some embodiments, the available units of the core media pool are selected based on historical performance of the available units as included in the historical data.

In one embodiment, the bid optimizer is a linear bid optimizer which can utilize a rainfall optimization in combination with a waterfall optimization as a heuristic for obtaining a near optimal initial state before further optimization is performed.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 4A, 4B and 4C are depictions of embodiments of interfaces for an entity providing input in accordance with generation of a media plan.

FIGS. 5A and 5B depict examples of a core media pool.

FIGS. 6A and 6B depict examples of a test media pool.

FIG. 7 depicts one example of a generated media plan.

DETAILED DESCRIPTION

Figure 1:
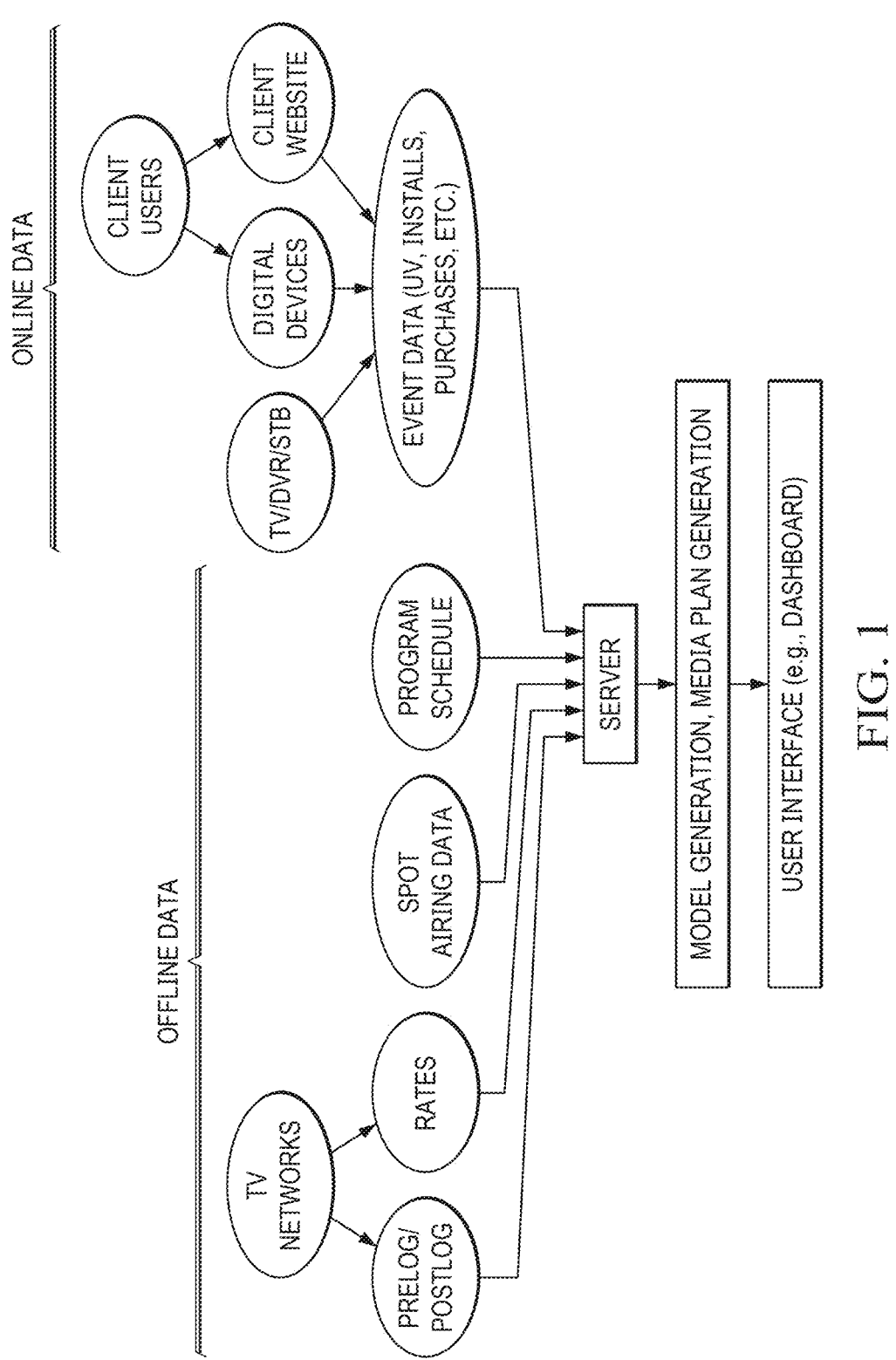
FIG. 1 is a diagram of a network environment in which embodiments disclosed herein can be implemented.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit or scope of the underlying inventive concept will become apparent to those skilled in the art from this disclosure.

Before delving into more detail regarding the specific embodiments disclosed herein, some context may be helpful. In the current environment for content delivery and consumption, there is a natural distinction between at least two mediums or networks. Today, there is the distribution network generally referred to as the "online" network for content distribution, where content is delivered over a computer based network such as the Internet World Wide Web (WWW) or the like. Non-linear TV may be delivered through such a computer based network. Non-linear TV covers streaming and on-demand programming (e.g., content), which can be viewed at any time and is not constrained by real-time broadcast schedules. Video-on-demand (VOD) and near video-on-demand (NVOD) transmissions of pay-per-view programs over channel feeds are also examples of non-linear TV.

In contrast, "linear TV" is an example of an offline medium that is disconnected from the digital world. Linear TV refers to real time (live) television services that transmit TV program schedules. Almost all broadcast TV services can be considered as linear TV.

There is a great deal of crossover between these types of distribution networks, both from a technological standpoint and from a business perspective. For example, many retailers, sellers, manufacturers or other entities (collectively retailers) of products or services (collectively products) have presences on the online distribution network (e.g., websites on the WWW, applications to install on a device, or the like), and in some cases, may only have a public facing presence on the online content distribution network (e.g., may only have a website on the WWW, not any brick and mortar retail locations). These retailers may, however, advertise their products, sites, applications, etc. both through an online distribution network (e.g., through ads on streaming content platforms) or through offline distribution network (e.g., traditional TV advertisements).

All these forms of TV are an indispensable advertising channel for many entities (e.g., any for profit or non-profit entity, including businesses, brands, non-profits, etc.), due to its potential for massive scale, low cost, and long-form format. Planning this advertising is, however, a complex endeavor. TV media buying (e.g., the purchasing of advertising slots) can be broadly divided into two groups. "Upfront buying" is negotiated and reserved typically months in advance. On the other hand, "remnant buying" can be thought of as an auction on the remaining inventory of media available at a certain point (e.g., an auction or other type of sale of advertising slots still available at a certain point). For example, remnant buying entails placing bids for ads to air as soon as the next calendar week.

Though it does not necessarily guarantee ad placement due to its auction-like nature, remnant buying is extremely effective for many entities. CPMs (cost per thousand impressions) are typically much lower when compared to upfront buying, and the weekly buying cadence allows for more agility with optimizations and flexibility with budgets. Remnant buying may be difficult, however, for certain entities that wish to purchase advertising. This difficulty arises in no small part because of the specialized domain knowledge usually required to facilitate effective purchasing of such remnants, especially in the context of content delivery networks.

In particular, an entity may have difficulty ascertaining what (television) channels or time slots (e.g., of the available advertising units' options, comprised of a channel and rotation or time slot) in which their advertising would be effective, or ever more pertinently would be most effective from a cost per effectiveness basis, especially given that the cost to win a bid may be unknown. This is complicated by a number of factors, including the fact that the advertising units (e.g., the inventory units of time slots and channels) on which to bid may vary during different time periods (e.g., from week to week) and the actual amount bid may affect the number and timing of advertising rotations "won" by the entity and thus available for running such advertising spots.

Embodiments herein may thus be adapted to efficiently generate media plans (e.g., for a particular time period such as a week) for remnant or other forms of TV (e.g., linear or non-linear TV) advertising, accounting for an entity's specific preferences (including those regarding channel (medium) of delivery (such as linear TV or type of non-linear TV), budgeting, pricing strategy, or other parameters).

Accordingly, a media plan engine according to certain embodiments is disclosed, where the media plan engine may automatically create remnant or other types of (linear or non-linear) TV advertising plans according to parameters and an objective input by a user (e.g., by using trained model to optimize such media plans). For example, the user could request a plan such as: "minimize (cost per view) CPV for a 50 k weekly campaign, while spending no more than 10% of budget on overnight TV ads".

In particular, a media plan generated by embodiments of a media plan generator may comprise two portions: a core plan generator for generating a core plan and a test plan generator for generating a test plan. The core plan may be produced based on historical data regarding historical performance of an entity's advertisements or ad purchases, while the test plan may be produced based on a prediction (e.g., generated from a predictive algorithm) of performance of available advertising slots or ad purchases. The core media plan and test media plan may be generated and divided according to various parameters including an entity's risk profile or risk tolerance (used here interchangeably) about the entity's relative desire to base their media plan on proven historical advertising or predictive metrics regarding performance.

The use of both a core media plan and a test media plan are adapted to provide embodiments the ability to allow an entity to balance an entity's desire for proven effective advertising with a predictive test plan to offer an entity advertising options that have been predictively determined to be effective based on trained machine learning models or other rules, allowing an entity to more easily A/B test their advertising strategies within both the framework of their risk profile and their budget.

Accordingly, embodiments may offer plans based on 1) historical performance data of an entity's advertisement if such data is available; 2) predictive performance of advertisements (e.g., determined using a predictive performance model) and 3) patterns (e.g., models) of bids and successful ad runs from previous periods that are optimized for a performance criteria (where those models may constructed based on all or a subset of entities that utilize the media plan engine, not just the entity of interest). This performance criteria may be "efficiency" which is a measure of the return on a particular target "metric" for every dollar spent on an ad.

Before delving into embodiments in more detail, an understanding of some terms used herein may be helpful.

Bid—a prospective booking (e.g., as produced as part of media plan by embodiments of a media plan engine as disclosed).

Booked Rate—the gross cost of a 30 second spot (e.g., advertising slot) in a bid.

Booked Spend—the total spend booked in a bid.

Booking—an order sent to a (e.g., television) network or specifying a particular booked rate, a number of spots (e.g., by duration such as ten 30 second spots) and an advertiser (e.g., purchaser of spots or other entity that wishes to air advertisements) to request the placement of advertisements on a specific rotation.

Clearance—the percentage of booked spend which a network(s) actually airs and charges the advertiser for. Can refer to single bookings (i.e., clearance of a booking), or to media plans in aggregate (i.e., clearance of a media plan).

Clearance Prediction Model—a model to predict the expected value of the clearance of a booking based on covariates such as the historical clearance over all advertisers for that network rotation, historical clearance for a specific advertiser on that network, etc.

CPX Prediction Model—A model to predict the efficiency of a given spot airing for an entity. In more detail, for a given TV spot at quoted rate cost and conversion event (such as a new visitor, or purchase) for a specific entity and ad creative—the target variable is the expected cost per event "cost-per-X."

Core Media Pool—Previously purchased units available for purchase for a given entity (advertiser), ranked by their historical performance. In other words, these may be units (e.g., network rotations) available for purchase that correspond to units that were previously purchased.

Core Plan—Plan constructed of units from a core media pool, part of a media plan.

Duration—The length of a TV advertisement in seconds. Standard durations include 15 s, 30 s, 60 s, and 120 s. The per spot cost is proportional to the duration. For example, a 15 s spot costs half as much as a 30 s spot.

Duration Split—percentage of 15 s, 30 s, 60 s, and 120 s spots in plan. Can be specified in terms of spend or in number of spots.

Exclusions—Media which the advertiser wishes to exclude from consideration in the media pool. For example, they may exclude airing on networks which they feel could negatively affect their brand image.

Media Plan—A collection of bids or bookings (e.g., in tabular format). A media plan may comprise a core media plan (or core plan) and a test media plan (or test plan).

Network Rotation—Is a rotation along with a specified broadcast network (e.g., television channel) (e.g., CNN weekday primetime). Linear TV advertisements are typically purchased as network rotations.

Network Tier—A classification of (television) networks (e.g., providers of television content) into different tiers. For example, television networks may be divided into the tiers 1, 2, 3 in terms of their reach and cost. Tier 1 networks tend to be the largest and most expensive, while tier 3 tend to be the smallest and least expensive.

Quoted Rate—A television network suggested booked rate for a given network rotation and week. In other words, how much a network suggested should be charged for an advertising time slot at a given time and day for a given week.

Rotation—A specified part of a broadcast week (e.g., for linear TV (e.g., the rotation "weekday primetime" means weekdays between 7 pm and 12 am Eastern Time).

Shave Rate—A percentage discount taken from the quoted rate to booked rate (e.g., booked_rate=quoted_rate* (1-shave_rate)).

Target Budget—A desired predicted cleared spend (e.g., specified by an entity) for a media plan to be generated.

Test Media Pool—Units available for purchase for a given entity (advertiser) ranked by their predicted value.

Test Plan—Plan constructed of units in the test media pool.

Value (of a unit)—The per dollar incremental benefit of a unit purchased at its quoted rate. This benefit can be defined in many different possible ways such as predicted CPX or predicted impressions.

Turning now to FIG. 1, embodiments of the systems and methods for generation of media plans may include one or more servers (e.g., physical, virtual, cloud based, etc.) in an online network (e.g., the Internet, an internet, a local area network (LAN), a wide area network (WAN), or the like). These media plan generation systems can thus receive, collect, or otherwise obtain a wide variety of data through the online network. This data may include data on a website such as event data associated with user views of the retailer's website, application installs, product purchases, time spent on the retailer's site or a wide variety of other data (including analytics data) associated with a user interaction with the web site (or application, which collectively will be understood to be referred to when a retailer's site or online presence is discussed). Such data is usually associated with an Internet Protocol (IP) address of the user's device used to access the retailer's online presence.

Additionally, data that may be obtained at such media plan generation systems may include data on the offline network including user interactions with offline network and advertising presented through the offline network. Typically, each individual advertisement is referred to as a "spot" or a "creative." Thus, the data that can be obtained may come from the various channels or TV networks (e.g., ABC, CBS, NBC, HGTV, ESPN, Bravo, etc.). This data may include data on programming (e.g., shows and times of airing in various markets), program demographics, times creatives were aired, pricing of airtime (e.g., for airing of spots), or the like, including for example, a planned schedule of TV spot airtimes and rate data defining how much that TV network charges for commercial spots placed at various times of the day. Likewise, spot airing data, program schedules, and program demographics can be obtained or provided by TV networks or media agencies.

Certain device manufacturers of connectivity providers (e.g., internet service providers or cable providers) may also obtain or collect data on user interactions with the offline network or programs or creatives airing thereon. For example, many "smart" TVs, digital video recorders (DVRs) (e.g., TiVos) or the like may be connected both to the offline network and the online network.

These devices may thus collect data on user's viewing, including what programs or TV channels were watched at what times, what programs were recorded, what programs (or portions thereof) were fast forwarded through or other data. This data can be reported back to the manufacturers or connectivity providers who may, in turn, provide such data to the quantification system. Moreover, because such data has been reported from a "smart" device that has connectivity to the online network, the IP address of the user on whom such data was collected may also be reported or associated with such data.

The media plan generation system may thus obtain these types (or a wide variety of other types) of data, on user's interactions with the offline network (e.g., what they saw or watched and when), what programs were aired on what channels at what time, what creatives were aired on what channels and at what time, who (e.g., what IP addresses) saw those creatives, who visited the retailer's online presence, who made a purchase, installed an application, etc., from the retailer's online presence or other data.

This data may be enhanced by the media plan generation system such that the media plan generation system may determine and store a set of enhanced data. A media plan generation can thus determine data related to the availability and pricing of spots on various networks, including the generation and use of related models to efficiently generate media plans (e.g., for a particular time period such as a week) for remnant or other forms of TV (e.g., linear or non-linear TV) advertising, accounting for an entity's specific preferences (including those regarding channel (medium) of delivery (such as linear TV or type of non-linear TV), budgeting, pricing strategy, or other parameters).

Accordingly, a media plan engine according to certain embodiments is disclosed, where the media plan engine may automatically create remnant or other types of TV advertising plans according to parameters and an objective input by a user (e.g., by using trained model to optimize such media plans).

Figure 2:
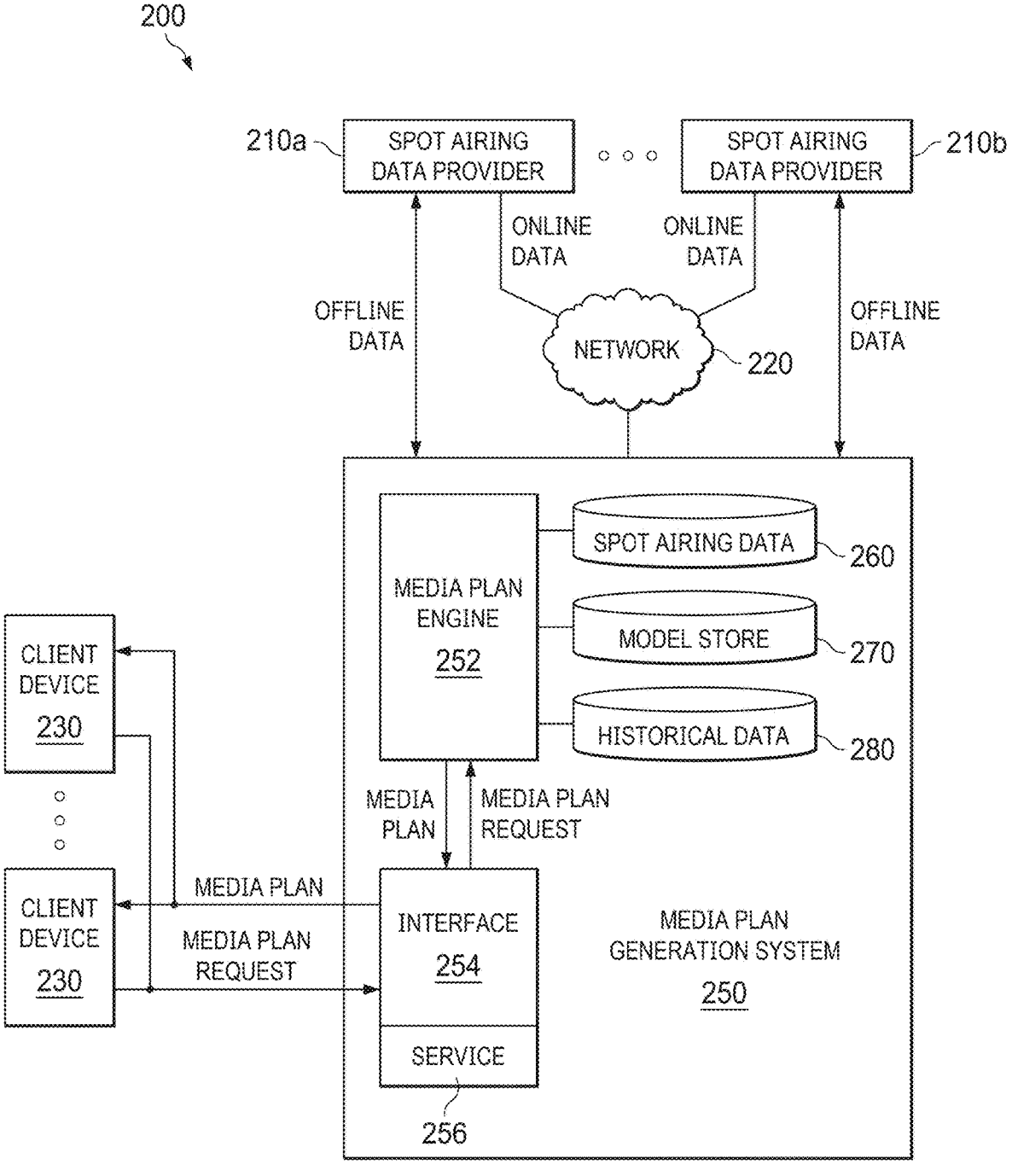
FIG. 2 depicts a media plan generation system in a network environment according to some embodiments.

FIG. 2 depicts one embodiment of a media plan generation system 250 including one embodiment of a media plan engine 252. Media plan generation system 250 is communicatively connected to spot airing data providers 210a . . . 210n through offline communication channels (e.g., telephones, mail, couriers, etc.) and also to spot airing data providers 210a . . . 210n over network 220 (e.g., Internet) in network environment 200. Examples of spot airing data providers 210a . . . 210n can include TV networks, media agencies, third-party data providers such as a market research firm, etc.

In some embodiments, media plan generation system 250 may be implemented on one or more server machines operated by a media performance analytics service provider. In some embodiments, media plan generation system 250 can reside on a cloud-based server operating in a cloud computing environment.

The providers of media performance analytics service may purchase (or bid on) spots from TV networks to air media creatives. The media performance analytics service provider may provide media plan generation system 250 with access to advertising data which, in turn, enables media plan generation system 250 to obtain or determine historical data 280 for rotations, network rotations, creatives, etc. for entities utilizing media plan generation system 250. This historical data 290 may thus include performance history for previous ad airings (effectiveness of previous ad airings, according to one or multiple attribution methodologies or metrics, as well as other relevant features). Thus, this historical data 280 may include performance data related to an entity's historical units of advertising in a linear (offline) TV medium television medium or a non-linear (online) TV medium.

Additionally, spot airing data providers 210a . . . 210n can provide online data or offline data. Examples of this data can include spot airing data such as data on available units of advertising available in an offline television medium, spot airing logs (e.g., from before and after spots have aired), rates from TV networks, program schedules, etc. This spot airing data 260 may be stored at media plan generation system 250.

Spot airing data 260 generally includes what and when spots aired and on what network and, in some cases, associated pricing data. Often there is not a uniform format of spot airing data received or obtained from spot airing data providers 210a . . . 210n. Media plan generation system 250 can identify and store spot airing data per each instance of a spot airing on a particular network at a particular time and associated with certain pricing data in spot airing data 260. In one embodiment, media plan generation system 250 is operable to perform, where necessary, data cleansing operations such as deduplication, normalization, data format conversion, etc.

In the embodiment of FIG. 2, media plan generation system 250 further includes media plan engine 252 and interface 254. As described below, media plan engine 252 is configured for determining media plans based on spot airing data 260, historical data 280, or models in model store 270 generated based on spot airing data 260. In particular, a request for a media plan may be received from a user (e.g., associated with an entity that wishes to place spots with a TV provider) at a client device 230 through interface 254, where this request may include a set of pool parameters, constraints, or optimization parameters. Based on this received request, media plan engine 252 may generate a media plan comprising two portions: a core plan based on historical data regarding historical performance of an the requesting entity's (e.g., associated with the requesting user) advertisements or ad purchases, while the test plan may be produced based on a prediction (e.g., generated from a predictive model in model store 270) of the performance of available advertising slots or ad purchases as included in spot airing data 260.

The efficacy of embodiments of media plan engine 252 may be increased by the use of multiple data source integrations as well as the capability to automatically submit insertion orders or bids corresponding to the generated plans to both linear TV networks on non-linear TV (e.g., streaming content providers). Spot airing data 260 may thus include, in some embodiments: available advertising inventory including units of advertising available (network name, parent network name, minimum spend requirements, network asking rate, first available date, last available date); an estimated capacity for inventory (for example, in a non-linear TV context such as streaming, an estimated maximum number of available ads served per day while for linear TV this type of data may include an estimated hours per week in network rotation). Spot airing data 260 may also include the building history of an entity and the outcomes of such bids (e.g., insertion orders or bids that were previously submitted along with their price and resulting clearance (acceptance rate)).

The spot airing data 260 may also include predicted performance for available inventory for spot (e.g., which may be derived at some point previous to a request, or in real-time when generating a media plan, by applying a statistical or machine learning model in model store 270 to the performance history of advertisements of an entity. Another type of spot airing data 260 may be enrichment data for available inventory (genres, demographics, language, daypart, etc.). The generated media plan can be provided in response to the request through interface 254. The media plan can thus be presented to the requesting user on client devices 230 through a user interface (UI) on the client device 230 or through another communication channel. In addition, bids corresponding to entries (e.g., all entries or individually designated or approved entries) in the generated media plan may automatically be submitted to spot airing data providers 210.

In some embodiments, media planning engine 252 is implemented as a microservice where data sources (e.g., spot airing data 260 or portion thereof) are then loaded to the media plan engine 252 via orchestrated jobs. The media plan engine 252 utilizes these data sources when generating a media plan according to the parameters of the received request, and then sends proposed media plans to a web service providing interface 254 (e.g., through protobuf or the like). The web service 256 can then submit an insertion order or bid to spot airing data providers 210 (e.g., one bid corresponding to each row in a tabular generated media plan).

Figure 3:
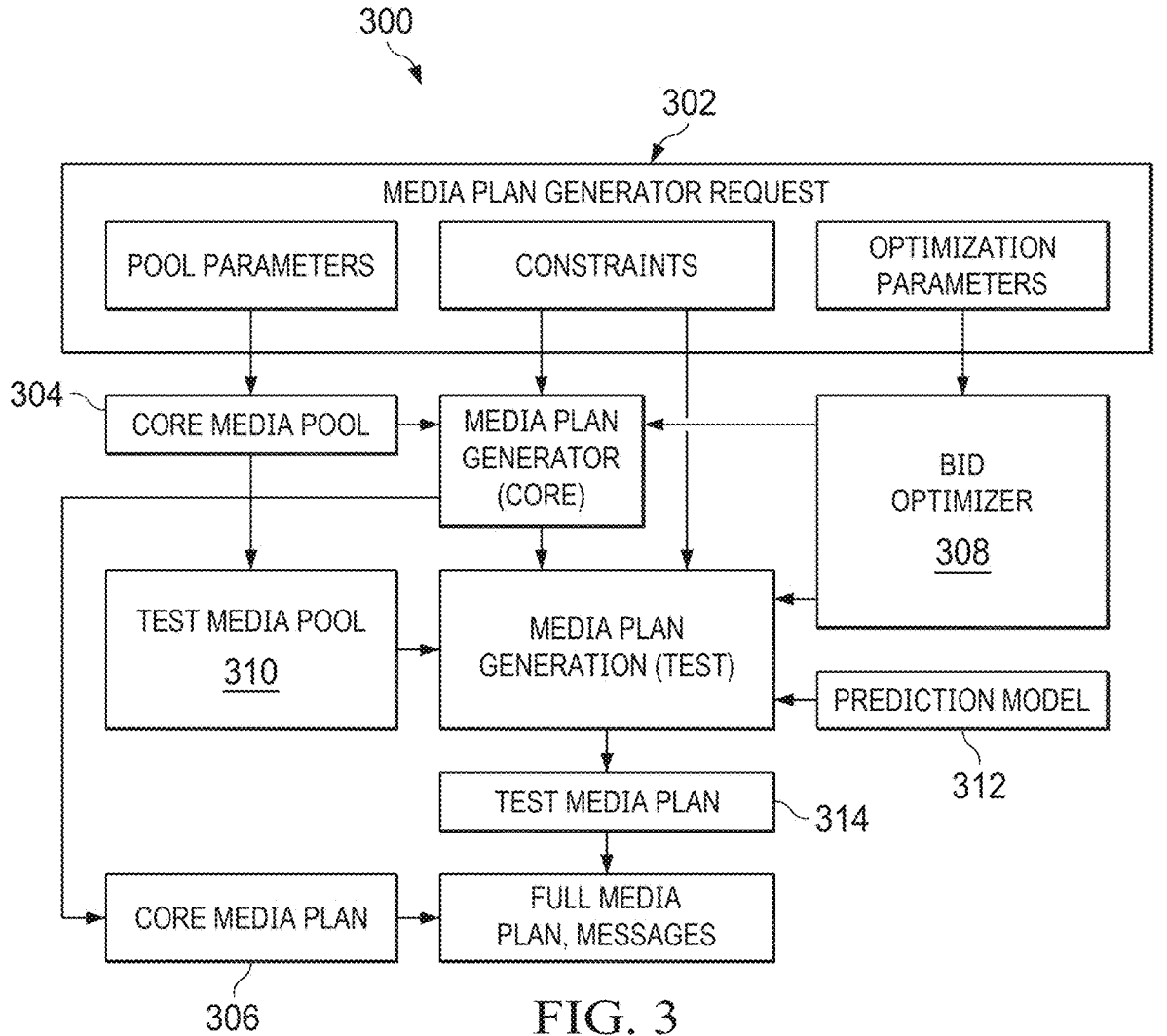
FIG. 3 depicts one embodiment of the operation of a media plan engine.
Figure 4A:
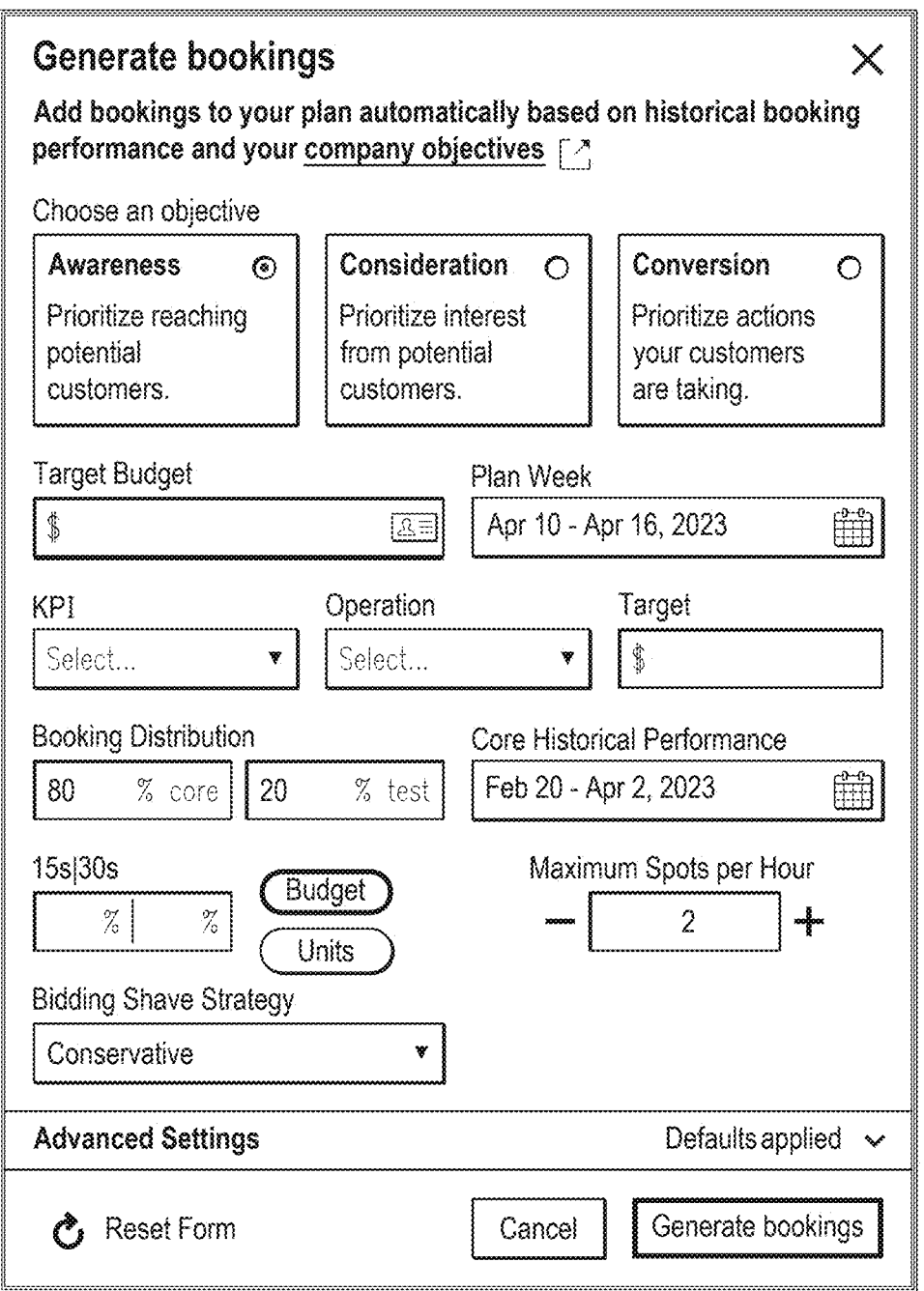
Figure 4B:
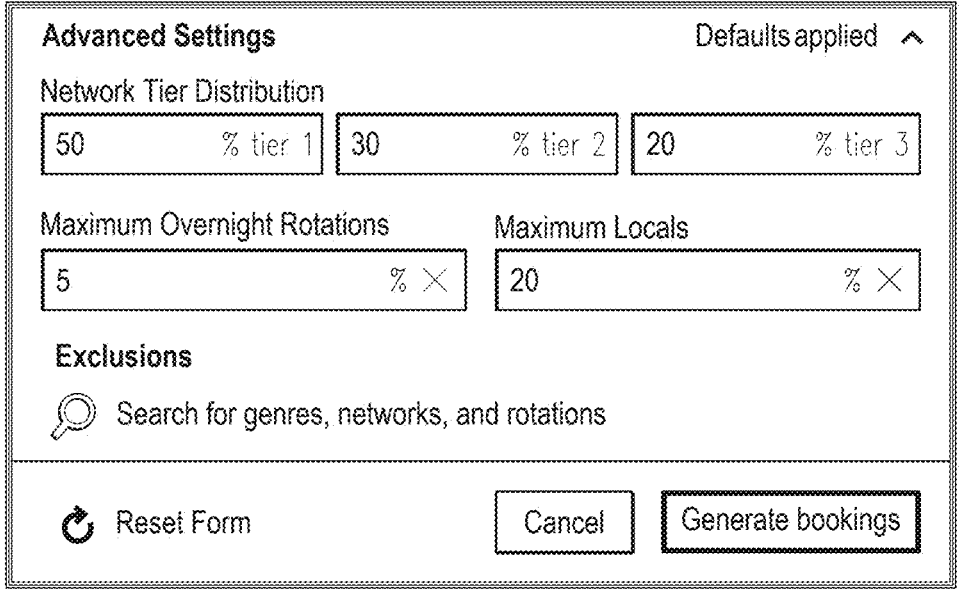

Moving now to FIG. 3, one embodiment of a media plan engine 300 is depicted. The media plan engine (MPE) is based on heuristics for media purchasing. First, units (e.g., rotations) that have performed well recently may be selected. In particular, units that have performed well (e.g., above some performance threshold) according to an advertiser's optimization metric or other Key Performance Indicator (KPI) may be selected.

A core media plan can be built from these selected units (e.g., rotations). The core media plan may thus include a number of available units (e.g., to purchase or place bids on) where the selected units of the core media plan may correspond to previous units of advertising (e.g., rotations where advertisements have previously been placed by an entity). These units (the selected units or number of selected units) may correspond to a (e.g., determined or specified) portion of a total budget. In this manner, the core media plan may serve to allocate a portion of a budget (e.g., of an entity) toward units having proven performance (e.g., according to historical data associated with units of the core media plan).

Next, units (e.g., rotations) to test may be chosen to form a test media pool. These rotations may be an inventory of advertising (e.g., spots) available that an entity has not yet run but may be expected to perform well-and then fill out some portion of the budget with the test plan comprising these test units. A test media plan comprising these test units can then be constructed (e.g., based on a predicted performance of these test units).

In one embodiment, the media plan engine 300 is adapted to operate according to the depicted flow. Initially, a user at an (advertiser) entity submits a request for a media plan generator 302. This request may include a set of pool parameters, constraints, and optimization parameters. FIGS.

4A, 4B and 4C depict embodiments of a graphical user interface that may be offered by a media plan engine to allow a user to specify such parameters. FIGS. 2A and 2B depict embodiments of interfaces that may be offered to allow a user to specify a request for a media plan for linear TV while FIG. 2C depicts an embodiment of an interface that may be used for a user to submit a media plan request for non-linear TV (e.g., streaming).

After the user of the entity submits a request for a media plan, a core media pool 304 is constructed by selecting available network rotations previously purchased by the entity and ranking them (e.g., according to their historical performance). For example, a core media pool may be created by selecting available units of advertising for the core media pool, wherein each of the selected available units corresponds to one or more of the entity's historical units of advertising. The ranking or historical performance of these units may be determined using a model (e.g., statistical or machine learning model, which may be referred to herein as a historical performance model). FIG. 5A depicts one example of a core media pool for linear TV while FIG. 5B depicts one example of a core media pool for non-linear TV (e.g., streaming).

The media plan generator then builds a core media plan 306 from units of network rotations in the core media pool 304 using bid optimizer 308 to perform (e.g., iterative) optimization of those units in the core media pool 304. Such iterative optimization may include perturbing combinations of aspects of (e.g., randomly) selected units of network rotations of the core media pool 304 and determining whether such perturbations have a positive effect on the overall performance (e.g., according to the optimization parameter of the media plan request) of the core media pool 304.

A test media pool 310 is then constructed from all available units (e.g., network rotations) (in some cases any rotations in the core media pool may be excluded from the test media pool). FIG. 6A depicts one example of a test media pool for linear TV while FIG. 6B depicts one example of a test media pool for non-linear TV (e.g., streaming).

This test media pool 310 is ranked according to predictions provided by a prediction model 312. For example, such a prediction model 312 may be a performance regression model or machine learning model adapted to predict performance for a (unit of) network rotation where this performance may be a cost per "event" metric. Thus, in certain embodiments, prediction model 312 may be a CPX prediction algorithm.

This prediction model 312 may be trained and updated (e.g., at regular or intermittent intervals) based on the historical performance data associated with a particular entity or all (or a subset of) the entities that utilize a media plan generation system. Thus, at a first time historical performance data for units of advertisements previously purchased or run for all (or a subset of) entities that utilize the media plan generation system may be utilized to form a first training set and the prediction model 312 trained on this first training set such that prediction model 312 is adapted to predict performance of network rotations based on values for features associated with those network rotations or an entity for whom the media plan is being generated. Similarly, at a second time historical performance data for units of advertisements previously purchased or run for all (or a subset of) entities that utilize the media plan generation system may be utilized to form a second training set and the prediction model 312 trained on this second training set.

The media plan generator 300 can then construct a test media plan 314 from this test media pool 310 using the bid optimizer 308 to perform iterative optimization of those units in the test media pool 310. Again, such an iterative optimization may include perturbing combinations of aspects of (e.g., randomly) selected units of network rotations of the test media pool 310 and determining whether such perturbations have a positive effect on the overall performance of the test media pool 310 (e.g., with respect to the optimization parameters). The test media plan 314 can then be combined with the core media plan 306 (e.g., returned to the user). FIG. 7 depicts one example of a (e.g., subset of) a media plan that may be provided to a user (e.g., for linear-TV).

Figure 8:
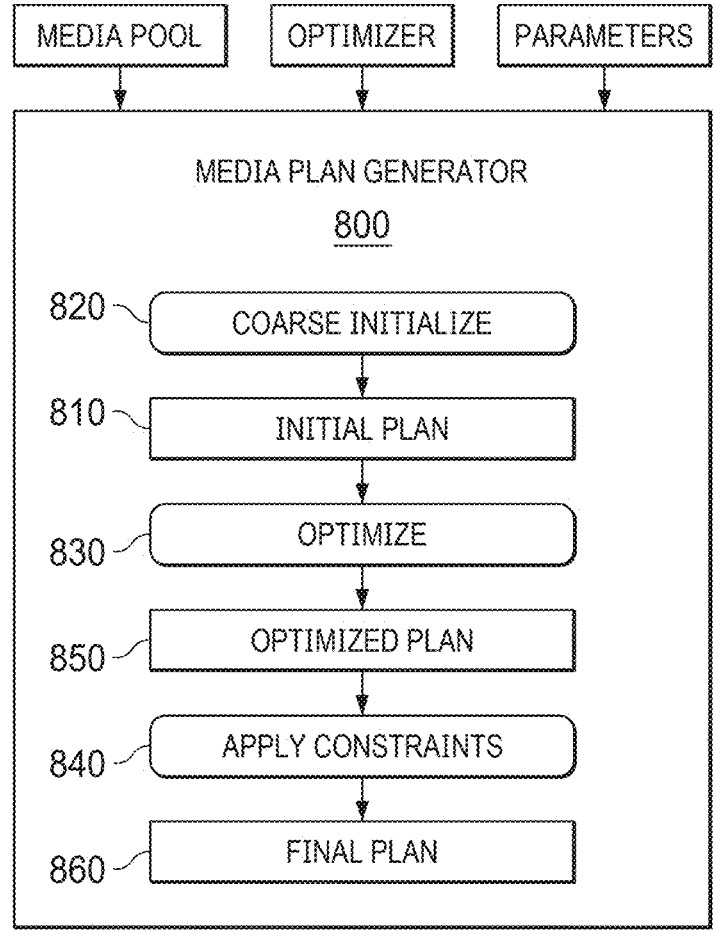
FIG. 8 depicts one embodiment of a media plan generator.

Looking now at FIG. 8, one embodiment of the operation of a media plan generator that may be used to generate a media plan comprising a core media plan and a test media plan in a media plan engine is depicted. As discussed, a media plan engine may utilize media plan generator (MPG) 800 twice during the generation of a media plan, the first time to generate a core media plan and the second to generate the test media plan. Each call to the MPG 800 results in similar processing by the MPG 800 to generate a respective (e.g., core or test) plan, as detailed herein.

MPG 800 takes as input a media pool comprising a set of units (a set of available inventory units of advertising rotations, for example, a time slot and channel that is available to bid on for running an advertisement), a value function (that assigns relative value to each unit in the pool) such a value function may be based on for example a target metric or other optimization strategy parameters an entity may provide, an input target budget (that may have been provided by entity desiring to advertise), and a set of parameters relating to optimization strategy and user constraints.

Optimization strategy parameters may include an objective (e.g., awareness, consideration, or conversion) that an entity desires to optimize. A bidding shave strategy (e.g., conservative, moderate, or aggressive) may relate to how much a discount or savings an entity may wish to obtain with respect to obtaining advertising spots. Constraints include maximum spots per hour (e.g., maximum number of ads an entity wishes to show per hour), duration distribution of the ads the entity wishes to run (e.g., 75% 30 second spots and 25% one minute spots), tier distribution (e.g., a specification of a percentage of each tier an entity desires to have their ads shown on), maximum overnight rotations, maximum local spots, and an exclusion list of specific networks, genres of channels, and rotations that the entity does not want at all (e.g., does not want their ads to air on those channels, time slots or genres of channels at all).

In one particular embodiment, the inputs to the media plan generator may comprise the following:

| Input | Input Type |
|---|---|
| Media Pool | Tabular - a set of available inventory units of advertising available - which may be specified as network rotations |
| Optimizer | Callable function that can be used to optimize a media plan (e.g., core or test plan) |
| Target Budget | Int greater than or equal to zero in config. An entity's advertising budget for the entire media plan to be generated. |

-continued

| Input | Input Type |
| --- | --- |
| Bidding Strategy | A specification of an entity's risk tolerance. This can be specified as a quantity (e.g., from 0-100) or divided up into tranches (e.g., Conservative, Moderate, or Aggressive) or some other method. |
| Duration fractions (%15 s, %30 s, %60 s, %120 s) | A specification of a mix of different time duration ads the entity wishes to run. Generally, there are four time periods for ad 15, 30, 60 and 120 seconds. Thus, a duration fraction may be 4 non-negative floats each corresponding to one of those time periods which sum to 1 |
| Spot Duration Pct-type | "spend-level" or "spot-level" in config |
| Exclusions | Lists of network ids or network rotation ids that the entity does not want their ads to run on |
| Tier Fractions (e.g. , % Tier 1, % Tier 2, % Tier 3) | A specification of a spend distribution of tiers of networks (e.g., for 3 tiers of network - 3 non-negative floats which sum to 1 in config) |
| Target (Optimization) Metric (metric for historical KPI) | A specification of the metric an entity wants to measure and predict (e.g., maximize) with respect to their ads, this could be for example, maximizing website visits, purchases, etc. This target metric may be specified as an integer associated with the target metric (e.g., Int (as ID) in config) |
| Media week | This is a date corresponding to the plan to be generated, in one embodiment may be a week while in another embodiment, different time periods may be used. This is one or more dates in config |
| Core Media Pool Start/End Dates (Window over which core performance is calculated) | This may be the looking back dates for historical data to utilize in determining historical performance of an entity's advertising. This is one or more dates in config |
| Objective | For example, options "Awareness," "Consideration," or "Conversion" in config |
| Maximum spots per hour | The maximum number of spots an entity wishes to air in a particular hour. (e.g., Int in config) |
| Max overnight/ locals | The maximum number of spots an entity wishes to air overnight or on a "local" channel. (e.g., Int in config) |

In some embodiments, the media plan generator 800 then operates in three main steps. The first step is to generate a rough initial plan 810 at a higher budget than the target budget (e.g., specified in the request). The budget may be set at this higher level by multiplying the target budget (e.g., provided by a user) by an "overbudget factor." In one embodiment, 10 may work well for this factor. This is called the coarse initialization stage (STEP 820). In this stage, a rough capacity for spend for each network rotation may be determined, the rotations ranked by the value function provided as input, and then spend greedily allocated to each rotation (starting with the highest value) until the plan total reaches the determined higher budget. The motivation for this coarse initialization phase 820 is to reduce the size of the consideration set for the overall media plan. This reduction of the media pool makes the optimization phase of the plan much more performant.

If an entity has specified a desired spend distribution by network tier, the computed value per advertising unit may be rescaled within each network tier such that a greedy allocation within each tier results in the same minimum unit value for each tier. This is done so that optimization does not substantially disrupt the initial balance of units between tiers-which would otherwise happen because a value function based on performance efficiency often values cheaper (lower-tier) units over more expensive (higher-tier) ones.

The next step is to optimize the initial plan 810 (STEP 830). For this step, a "secondary budget" may be utilized. This secondary budget may be smaller than the initial budget (allowing the optimizer to be selective and improve the projected performance), but still larger than the final target budget of the plan, so that the optimized plan can be "trimmed down" as needed to apply constraints. In one embodiment, three times the target budget may be utilized. A (e.g., linear) bid optimizer may then be utilized (e.g., called) to optimize the initial plan according to the secondary budget and user inputs. The operation of the bid optimizer is described in more detail herein below.

Once the initial plan 810 is optimized to generate the optimized plan 850, any entity-specified constraints may be applied to the (e.g., portion of) media plan being generated (e.g., the core media plan or test media plan) (STEP 840). These can include, for example, percentage spend by network tier, maximum overnight TV spots, and maximum local TV spots. This is done greedily. For example, if the maximum budget for Tier 3 spots is 25 k, Tier 3 spots may be added from most valuable to least valuable using the "waterfall" method, and then stop adding them once the budget (e.g., 25 k) is reached. The application of constraints to the optimized plan 850 will result in the generated final plan 860 (e.g., a final test plan or final core plan).

The operation of embodiments of a bid optimizer will now be described in more detail. As described, in remnant-space TV advertising, spots may be purchased at a lower rate than that at which a network would charge an advertiser for guaranteed spots. If there is available inventory, this can have an advantage of allowing advertisers to purchase advertising time at significantly discounted rates. However, the risk of booking on the remnant market is that the booked spots are not guaranteed.

In some cases, this may work as follows: an advertiser (or third party on behalf of the entity that wishes to advertise) "books" a certain number of spots for a given media week on a network rotation, at a certain "shave rate" (or fraction below the full "rate card" price). During the week, those spots may or may not air. The fraction of booked spots that actually air on the network is known as the "clearance." If an advertiser books 10 spots for a week, and only 7 air, the advertiser only pays for those seven spots; that is 70% clearance. In general, if bids are made at lower prices (higher shave rate), the clearance may be expected to be lower; but sometimes if inventory is tight, even higher prices may not clear fully. Accordingly, embodiments of a bid optimizer are adapted to balance the efficiency benefits that come with shaving with the uncertainty of clearance, guided by the expected value of each inventory unit and a predictive model for the clearance percentage.

Figure 9:
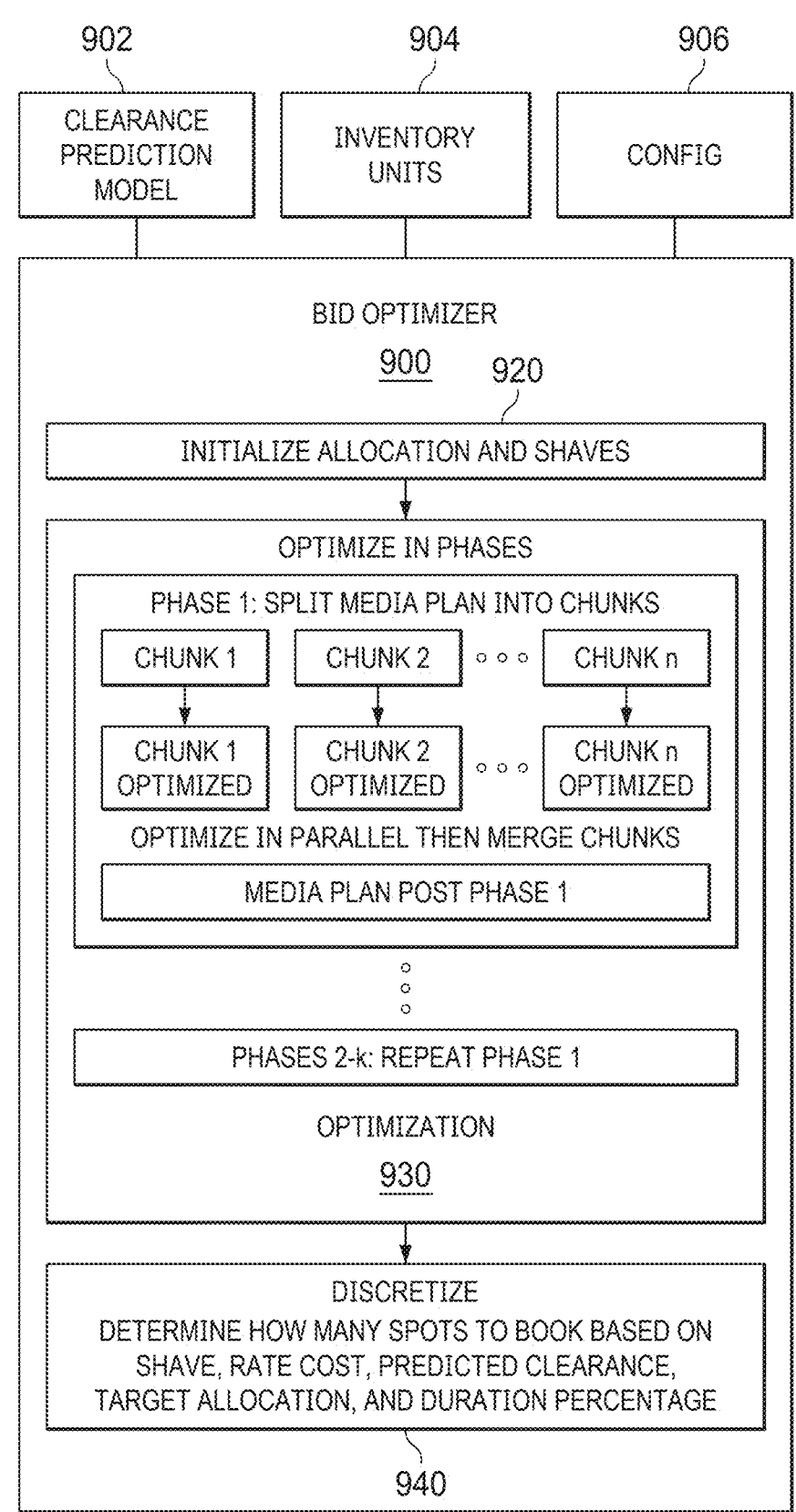
FIG. 9 depicts one embodiment of a bid optimizer.

FIG. 9 is a block diagram depicting one embodiment of a bid optimizer 900. In this embodiment, linear bid optimizer (LBO) 900 takes as inputs a clearance prediction model 902, a set of inventory units 904 with each assigned a relative value, and a collection of user inputs called a config 906. Here, the LBO 900 may assign a number of spots and a bid price to each inventory unit to construct a media plan-resulting in a total predicted spend equal to the target budget, and with maximal predicted performance (respective to the indicated optimization parameter of the request submitted by an entity), while maintaining an acceptable risk level (e.g., as input by an entity). It will be noted that embodiments of an LBO 900 may be used not only within an MPE as described, but also in a standalone use case where entities desiring to purchase media may select their own set of inventory, total target budget, and pricing strategy.

As mentioned elsewhere herein, embodiments of an LBO 900 may utilize as one input a setting for aggressiveness of a bidding strategy. Such a setting may be variable or tiered such that it may differ. This input is utilized at least because different entities may have different risk tolerances, and different priorities. Generally then, it may be desirable to have a directional strategic setting available to the user such as more conservative=more predictable spend at the expense of lower expected efficiency or more aggressive=higher expected efficiency at the expense of more volatile spend.

Generally, then, inputs to an embodiment of an LBO 900 may be as follows:

| Input | Input Type |
|---|---|
| Media plan of selected units (rotations), rotation capacities, and values for each rotation (this may be for example an (e.g., initial) core plan or test plan | tabular |
| Clearance Predictor | Callable function that can generate a clearance prediction for one or more advertising units |
| Target Budget | Int greater than or equal to zero in config |
| Bidding Strategy | Conservative, Moderate, or Aggressive in config |
| Duration fractions (% 15 s, % 30 s, % 60 s, % 120 s) | For example, 4 non-negative floats which sum to 1 in config |
| Spot Duration Pct-type | For example, "spend-level" or "spot-level" in config |

Using these inputs then, the LBO 900 may be initialized (STEP 920). In this step, the LBO would determine an initial shave rate for each unit using a weighted blend between the following three heuristics:

Constant shave—e.g., shave all units 30%.

Constant clearance—e.g., shave all units so that predicted clearance=90%

Historical precedent—e.g., shave all units at 70th quantile for that unit

The weights and constants/quantiles are determined by the input bidding strategy (e.g., input by the user associated with the entity). The aggressive strategy produces higher shave rates and lower clearance rates, and vice versa for the conservative strategy.

Once the shave values are initialized, the max predicted spend capacity of each unit at the given shave value are predicted (the shave value affects the predicted spend capacity in two ways: the per-spot cost is a function of shave rate, but also, the predicted clearance is also a function of shave rate).

Once the max predicted spend capacity of each unit is determined, the booked spend of each unit is initialized using a blend of two heuristics—the "waterfall method" and the "rainfall method," both illustrated below. These two methods are blended by linearly interpolating the spend on each unit between them.

Figure 10B:
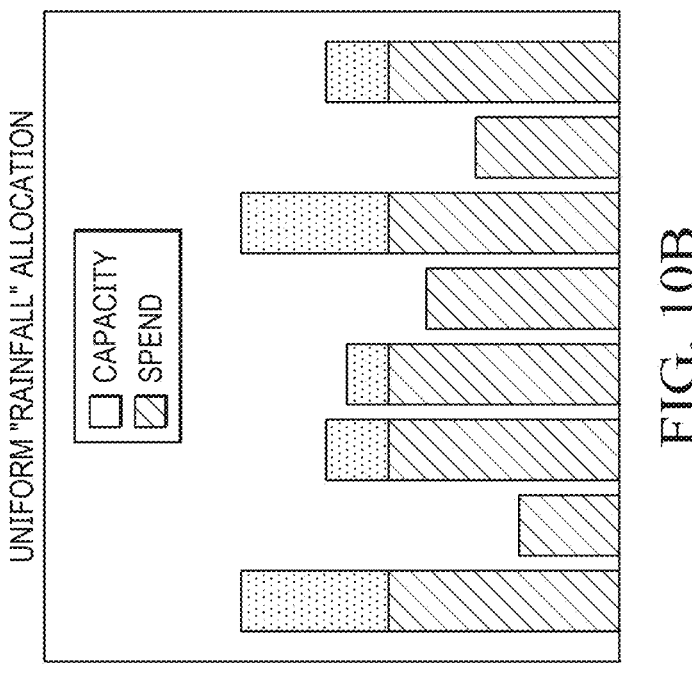
FIG. 10B depicts one embodiment of a rainfall method.
Figure 10A:
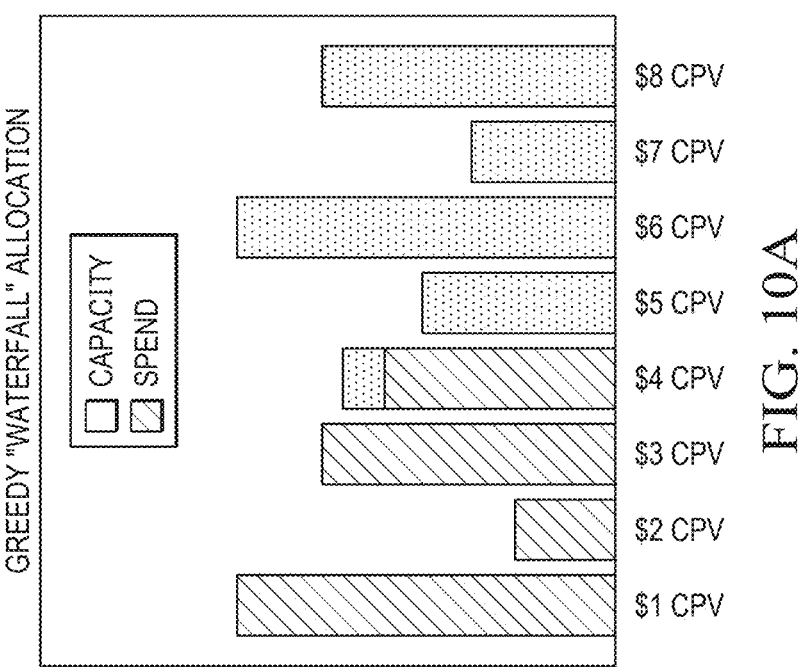
FIG. 10A depicts one embodiment of a waterfall method.

One embodiment of the "waterfall method" is depicted in FIG. 10A and starts by filling the best rotations to capacity and going down the list to worse rotations. One embodiment of the "rainfall method" is depicted in FIG. 10B, this rainfall method attempts to allocate spend to all rotations evenly (though some may fill to capacity).

Once the LBO is initialized the optimization phase may occur (STEP 930). Such an optimization may be iterative. In the optimization phase an attempt is made to improve the projected performance of the plan being optimized while keeping the overall booked spend and overall predicted clearance constant. More formally, an attempt is made to maximize the objective function:

$$\text{sum}(\text{booked\_spend}*\text{predicted\_clearance}(\text{shave})/(1-\text{shave})*\text{value}), \text{ subject to the constraints:}$$

$$\text{sum}(\text{booked\_spend})=\text{sum}(\text{initial\_booked\_spend}),$$

$$\text{sum}(\text{booked\_spend}*\text{predicted\_clearance}(\text{shave}))=\text{sum}(\text{initial\_booked\_spend})*\text{sum}(\text{initial\_predicted\_clearance}),$$

$$\text{and booked\_spend}<=\text{capacity}(\text{shave}), \text{ for all units where the sums range over all units in the plan.}$$

According to embodiments this maximization may be done in an iterative process, where in each iteration, two rows of the input plan are sampled and just those two units are adjusted. Adjusting unit" here means that either the spend or the shave rate is selected (with equal probability) to perturb. If the value of the plan increases with the perturbation, it is kept (e.g., the plan is altered to include the perturbed values instead of the old values for the spend or shave rate for those two units); if not, the bids for the two units are left as they were. This process works to maintain the overall constraints because of the following key observation: if two units are adjusted in such a way that the booked spend and predicted cleared spend between those two units remains unchanged, the total booked spend and predicted cleared spend of the entire plan remains unchanged.

In some embodiments, the pseudo code for a shave perturbation is as follows:

Sample two rows in media plan (rot A, rot B).

Define subplan=(rot A, rot B).

If rot A booked<capacity:

Compute impact of increasing rot A shave by & and decreasing shave of rot B such that subplan clearance is constant.

If subplan performance improves and rot A booked is still within capacity:

Keep the perturbation

Else:

Revert subplan to its original state

The pseudo-code for a spend perturbation is analogous.

This process may iterate for a set number of cycles (each of which contains N iterations), or until the improvement between cycles is negligible.

Once the plan has been optimized, it can then be discretized (STEP 940). As may be realized, an optimization process may output a booked spend for each advertising unit as something other than an integer (e.g., as a floating value). In practice, it may be required to book an integer number of units for each rotation and those units can either be 15 s, 30 s, 60 s, or 120 s-which respectively cost ½, 1, 2, and 4 times the booked rate cost. The discretization step entails picking numbers of spots by duration to book for each rotation, such that the total cost booked is close to the float value before, and the entities preferences for proportion of units by duration are satisfied.

As may be realized, such an optimization process may utilize a significant amount of computing resources. Thus, a number of configurations and architectures may be applied to improve the performance of such optimization and a media plan engine more generally. For example, the clearance prediction results may be cached. Additionally, the optimization process may be parallelized to the extent possible. Since the pairwise perturbation may not be done in parallel on the same media plan in certain cases, the media plan may be (e.g., randomly) split into smaller subplans and those subplans optimized in parallel. Optimizing over subplans may mean that many of the possible pairs of rotations will end up in distinct subplans. To mitigate this, some embodiments may optimize in phases, re-merging and re-splitting the plan between each phase. The step size of the perturbations may decay with each successive phase. FIG. 9 represents this parallelization and other designs of the LBO to improve performance diagrammatically.

While embodiments of an LBO have been described, it should be noted that it is also possible to transform this optimization problem into an integer linear program (where in the context of this paragraph, linear program refers to a mathematical model whose objective and constraints are expressed by linear relationships). In addition, the integer linear program formulation has a relaxed formulation as a linear program, which can be used to quickly find an approximate solution.

It is also important to note that the concepts developed and described in this disclosure can apply equally to almost any form of television discussed above, including direct insertion order (direct IO) streaming TV advertising or other forms of television, including those forms of TV where impression costs are fixed and do not follow a bidding process, and all such embodiments are fully contemplated herein For example, a media plan engine as applied to non-linear TV (e.g., streaming) may be substantially the same as in the linear TV case (e.g., as depicted in FIG. 1). However, as streaming ad impressions may be set as a fixed price, there may not be a need to adjust for bidding prices, and hence no need to apply bid optimization. These embodiments may thus have no need to perform the coarse initialization as described above. Instead, the optimization and application of constraints can be done simultaneously by setting up a linear programming model (e.g., linear function) and applying an optimization solver to find the allocation of budgets that maximizes the objective (the objective corresponding to a predicted outcome the user wishes to maximize such as purchases or reach as submitted in the request) within the user's various budget and campaign constraints. These constraints can include overall budget constraints, as well as maximum allocation across various segments (e.g., max spend per streaming publisher, max spend per genre, minimum spend per publisher, etc.). Other variations are possible and fully contemplated herein.

Figure 11:
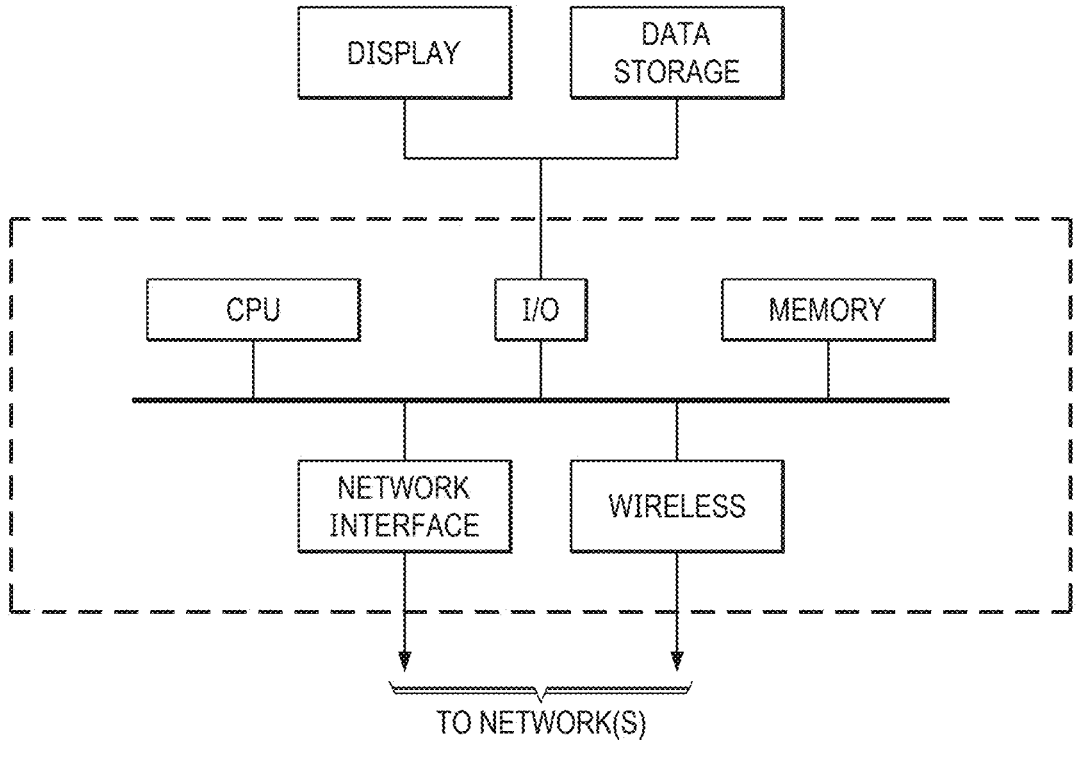
FIG. 11 depicts one embodiment of a computing system for implementing a media plan engine.

FIG. 11 depicts a diagrammatic representation of one embodiment of a computing system for implementing a media plan engine. As shown in FIG. 11, computing systems may include one or more central processing units (CPU), or processors coupled to one or more user input/output (I/O) devices and memory devices. Examples of I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs), smart cards, etc. Data processing systems can be coupled to display, information device and various peripheral devices (not shown), such as printers, plotters, speakers, etc. through I/O devices. Data processing system may also be coupled to external computers or other devices through network interface, wireless transceiver, or other means that is coupled to a network such as a local area network (LAN), wide area network (WAN), or the Internet.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard drive (HD)), hardware circuitry or the like, or any combination.

Embodiments of a hardware architecture for implementing certain embodiments are described herein. One embodiment can include one or more computers communicatively coupled to a network. At least portions of the functionalities or processes described herein can be implemented in suitable computer-executable instructions. The computer-executable instructions may be stored as software code components or modules on one or more computer readable media (such as non-volatile memories, volatile memories, direct access storage drive (DASD) arrays, magnetic tapes, floppy diskettes, hard drives, optical storage devices, etc. or any other appropriate computer-readable medium or storage device). In one embodiment, the computer-executable instructions may include lines of compiled C++, Java, hypertext markup language (HTML), or any other programming or scripting code.

Additionally, the functions of the disclosed embodiments may be shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:
a processor;
a data store, comprising:
spot airing data received from one or more spot airing data providers, the spot airing data including data on available units of advertising available in an offline television medium; and
historical data comprising historical performance data related to an entity's historical units of advertising in the offline television medium;
a non-transitory computer readable medium, comprising instructions that, when executed, cause the processor to:
obtain a media plan request comprising an optimization parameter;
generate a media plan comprising a core media plan and a test media plan by:
generate the core media plan, the generation of the core media plan comprising:
create a core media pool by selecting available units of advertising for the core media pool, wherein each of the selected available units corresponding to one or more of the entity's historical units of advertising;
rank the available units of the core media pool; and
optimize the core media plan according to the optimization parameter based on the rankings of the available units of the core media pool using a bid optimizer by applying a clearance prediction model to the available units of the core media pool,
search the space of configurations of bids on the available units of the core media pool, and
evaluate the result of each configuration based on the optimization parameters; and
generate a test media plan, the generation of the test media plan comprising:
create a test media pool by selecting available units of advertising for the test media pool;
rank the available units of the test media pool based on a predictive model;
optimize the test media plan according to the optimization parameter based on the rankings of the available units of the test media pool using the bid optimizer by applying a clearance prediction model to the available units of the test media pool,
search the space of available units of the test media pool, and
evaluate the result of each configuration based on the optimization parameters.

2. The system of claim 1, wherein the available units of the core media pool are selected based on historical performance of the available units as included in the historical data.

3. The system of claim 1, wherein the bid optimizer is a linear bid optimizer.

4. The system of claim 3, wherein the bid optimizer utilizes a rainfall optimization in combination with a waterfall optimization.

5. The system of claim 1, wherein the optimization of the core media plan and test media plan comprises optimizing chunks of each media plan in parallel.

6. The system of claim 1, wherein the media plan request comprises one or more constraints, and the instructions are further adapted for applying the one or more constraints to the optimized core media plan and the optimized test media plan.

7. A method, comprising:
obtaining spot airing data received from one or more spot airing data providers, the spot airing data including data on available units of advertising available in an offline television medium;
obtaining historical data comprising historical performance data related to an entity's historical units of advertising in the offline television medium;
obtaining a media plan request comprising an optimization parameter;
generating a media plan comprising a core media plan and a test media plan by:
generating the core media plan, the generation of the core media plan comprising:
creating a core media pool by selecting available units of advertising for the core media pool, wherein each of the selected available units corresponding to one or more of the entity's historical units of advertising;
ranking the available units of the core media pool; and
optimizing the core media plan according to the optimization parameter based on the rankings of the available units of the core media pool using a bid optimizer by applying a clearance prediction model to the available units of the core media pool, searching the space of configurations of bids on the available units of the core media pool, and evaluating the result of each configuration based on the optimization parameters; and
generating a test media plan, the generation of the test media plan comprising:
creating a test media pool by selecting available units of advertising for the test media pool;
ranking the available units of the test media pool based on a predictive model;
optimizing the test media plan according to the optimization parameter based on the rankings of the available units of the test media pool using the bid optimizer by applying a clearance prediction model to the available units of the test media pool, searching the space of configurations of available units of the test media pool, and evaluating the result of each configuration based on the optimization parameters.

8. The method of claim 7, wherein the available units of the core media pool are selected based on historical performance of the available units as included in the historical data.

9. The method of claim 8, wherein the bid optimizer is a linear bid optimizer.

10. The method of claim 9, wherein the bid optimizer utilizes a rainfall optimization in combination with a water-fall optimization as a heuristic for obtaining a near-optimal initial state.

11. The method of claim 7, wherein the optimization of the core media plan and test media plan comprises optimizing chunks of each media plan in parallel.

12. The method of claim 7, wherein the media plan request comprises one or more constraints, and the one or more constraints are applied to the optimized core media plan and the optimized test media plan.

13. A non-transitory computer readable medium, comprising instructions that, when executed, cause a processor to:

obtain spot airing data received from one or more spot airing data providers, the spot airing data including data on available units of advertising available in an offline television medium;

obtain historical data comprising historical performance data related to an entity's historical units of advertising in the offline television medium;

obtain a media plan request comprising an optimization parameter;

generate a media plan comprising a core media plan and a test media plan by:

generate the core media plan, the generation of the core media plan comprising:

create a core media pool by selecting available units of advertising for the core media pool, wherein each of the selected available units corresponding to one or more of the entity's historical units of advertising;

rank the available units of the core media pool; and optimize the core media plan according to the optimization parameter based on the rankings of the available units of the core media pool using a bid optimizer by applying a clearance prediction model to the available units of the core media pool, search the space of configurations of available units of the core media pool, and evaluate the result of each configuration based on the optimization parameter; and generate a test media plan, the generation of the test media plan comprising:

create a test media pool by selecting available units of advertising for the test media pool;

rank the available units of the test media pool based on a predictive model;

optimize the test media plan according to the optimization parameter based on the rankings of the available units of the test media pool using the bid optimizer by applying a clearance prediction model to the available units of the test media pool, search the space of configurations of available units of the test media pool, and evaluate the result of each configuration based on the optimization parameter.

14. The non-transitory computer readable medium of claim 13, wherein the available units of the core media pool are selected based on historical performance of the available units as included in the historical data.

15. The non-transitory computer readable medium of claim 14, wherein the bid optimizer is a linear bid optimizer.

16. The non-transitory computer readable medium of claim 15, wherein the bid optimizer utilizes a rainfall optimization in combination with a waterfall optimization.

17. The non-transitory computer readable medium of claim 13, wherein the optimization of the core media plan and test media plan comprises optimizing chunks of each media plan in parallel.

18. The non-transitory computer readable medium of claim 13, wherein the media plan request comprises one or more constraints, and the instructions are further adapted for applying the one or more constraints to the optimized core media plan and the optimized test media plan.

* * * * *